Nov. 19, 1957            R. LEVI            2,813,807
METHOD OF MAKING A DISPENSER CATHODE
Filed July 19, 1954
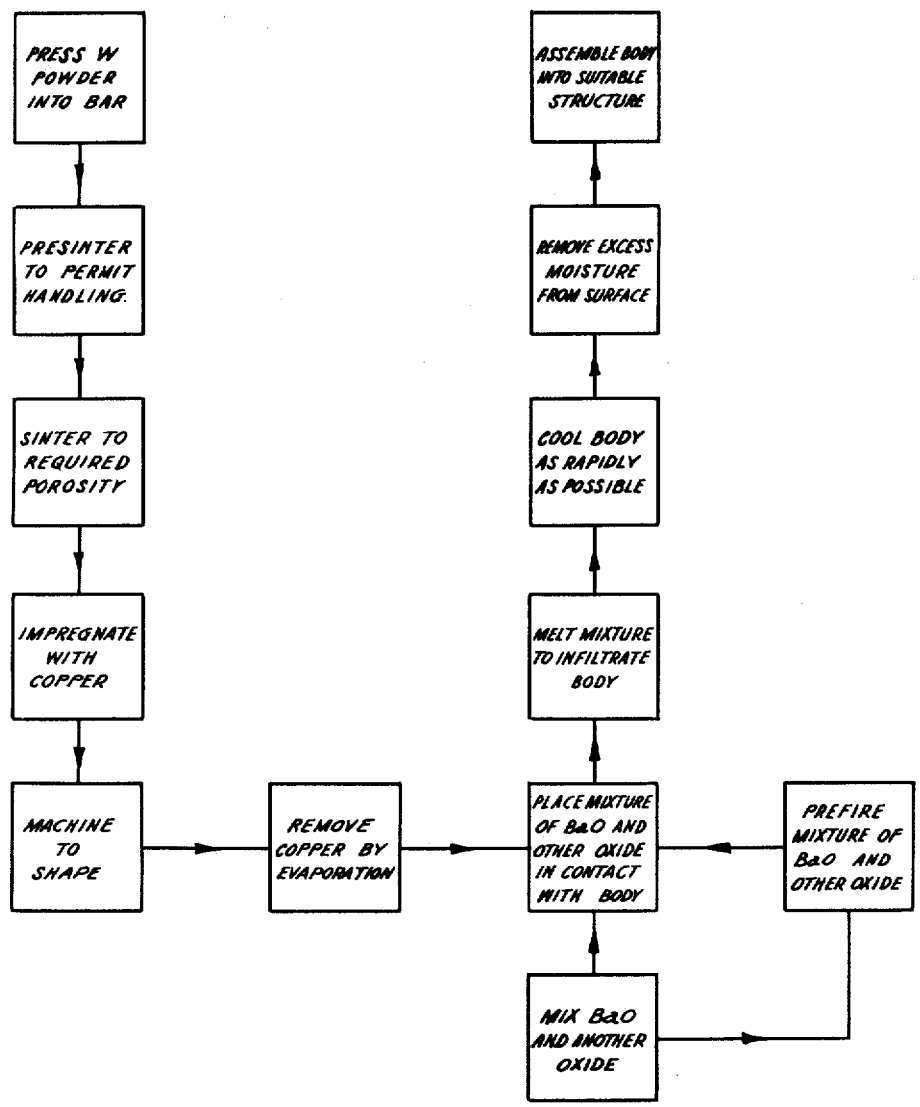
INVENTOR.
ROBERTO LEVI
BY
AGENT.

United States Patent Office 2,813,807
Patented Nov. 19, 1957

2,813,807
METHOD OF MAKING A DISPENSER CATHODE

Roberto Levi, New York, N. Y., assignor to North American Philips Company, Inc., New York, N. Y., a corporation of Delaware Application July 19, 1954, Serial No. 444,323

2 Claims. (Cl. 117—224)

My invention relates to a method of making a dispenser type thermionic cathode.

This application, which is a continuation-in-part of application Serial No. 273,607, filed February 27, 1952 by R. Levi and R. C. Hughes, now Patent No. 2,700,000, is more particularly concerned with making a cathode comprising a preformed porous body of refractory metal whose pores have been impregnated from a melt with a fused mixture of BaO and one or more other metal oxides. This mixture reacts during operation of the cathode with the refractory metal, for example, tungsten, to supply free barium to an emissive surface of the body.

Since tungsten and similar refractory metals oxidize rapidly in air at elevated temperatures, impregnation is preferably carried out in a vacuum or in a dry inert, or slightly reducing, atmosphere. Direct impregnation of a porous refractory body with barium oxide alone is not satisfactory, however, because barium oxide has a very high melting point (1923° C.) and at that temperature has such a high evaporation rate in vacuum that it is very difficult to completely impregnate the porous body from the melt.

Moreover, since the barium oxide tends to react very rapidly with the refractory metal during impregnation a "dead" cathode frequently results because no barium oxide is left for reaction with the refractory metal during operation of the cathode.

Furthermore, during operation of the cathode the evaporation rate of barium and barium oxide is largely dependent upon the porosity of the tungsten body. If, however, the original density of the porous body exceeds the value of about 83% of theoretical value, the number of non-connecting pores which cannot be impregnated increases very rapidly and at a value of about 90% of the theoretical density, practically all of the pores are non-connecting and impregnation from the melt becomes virtually impossible.

It is the main object of my invention to provide a method of making a dispenser type cathode by impregnating a porous refractory body with a source of barium other than barium oxide alone.

A further object of my invention is to provide a method of making a dispenser cathode by impregnating a porous refractory metal body with a source of barium having a reduced rate of evaporation of barium oxide during impregnation therewith of the porous body as compared to the evaporation rate of barium oxide alone.

A still further object of my invention is to provide a method of making a dispenser cathode by impregnating a porous refractory metal body with a source of barium which has a reduced rate of reactivity with the refractory metal during impregnation as compared to the reactivity of barium oxide alone.

A further object of my invention is to provide a method for reducing the effective pore diameter of the porous body available for the active ingredient without increasing the number of non-connecting pores for the purpose of lowering the evaporation rate of barium and barium oxide during operation of the cathode as though the porosity of the body were much lower than its original value as established by sintering.

These and further objects of my invention will appear as the specification progresses.

The foregoing objects may be attained and the aforesaid difficulties avoided in accordance with my invention by mixing with BaO, or with a barium compound which upon heating decomposes to form BaO, one or more other oxides or substances which are thermally decomposable to oxides and which upon heating either form with BaO compounds in which the vapor pressure of BaO at the melting point of the compound is substantially lower than that of BaO alone at its melting point or form mixtures containing free BaO which have lower melting points than free BaO alone. The so-formed materials must be capable of penetrating a preformed porous body of refractory metal.

Thus, the vapor pressure of BaO above the resulting composition at its melting point will in either case be lower than that of BaO alone at its melting point and the first difficulty is thereby avoided. This lowering of the vapor pressure of BaO above the impregnant also produces a lowering of the reactivity with the refractory metal and therefore the second difficulty is thereby avoided. There is, however, a lower limit to the reduction in reactivity of the compound with the refractory metal since it is necessary for good cathodes that Ba and/or BaO be produced at the operating temperature of the cathode at a rate sufficient to have the surface substantially covered with an absorbed mono-layer of Ba and/or BaO.

An essential requirement of the oxide or oxides other than BaO is that they do not react appreciably with the refractory metal during operation of the cathode so that the principal reactions involving the refractory metal and the impregnant are those productive of free alkaline earth metal. Oxides suitable for this purpose are aluminum oxide, silicon dioxide, boric oxide, beryllium oxide, rare earth metal oxides such as neodymium oxide, praseodymium oxide, and lanthanum oxide, mixtures of aluminum oxide with other alkaline earth metal oxides, viz. mixtures of magnesium oxide, calcium oxide, and strontium oxide with aluminum oxide.

In a preferred embodiment of my invention, a prefired mixture of the oxides is placed in direct contact with a preformed porous refractory metal body and heated slowly in vacuum to a temperature below its melting point to remove residual gases and to degas the porous body. The temperature is then rapidly raised to slightly above the melting point of the mixture and maintained at this temperature for the shortest possible time required for complete or partial penetration of the porous body by the molten mixture. After impregnation, the body is cooled as rapidly as possible in order to minimize the reaction between the refractory metal and the barium containing material in the pores.

Vacuum firing is preferred but impregnation may be carried in an atmosphere of a dry inert or mildly reducing gas such as mixtures of hydrogen and nitrogen or helium and the term "inert atmosphere" in the specification and claims is intended to include a vacuum as well as the latter types of atmospheres.

The invention will be described in connection with the accompanying drawing which is a flow chart of the method according to the invention.

Initially I start with a mass of refractory metal powder, preferably tungsten powder, which is pressed into a bar and pre-sintered at about 1100° C. to facilitate handling. The pre-sintered bar is then heated by placing the bar between electrodes and passing an electric current through the bar to raise the temperature of the bar to about 2400° C. (optical) and is maintained at that temperature for about 20 minutes in order to sinter the bar into a body having the desired porosity.

This bar which now has a density of about 83% of theoretical density is then impregnated with copper, machined, and the copper removed by evaporation all as described in United States Patent 2,669,008.

Alternatively, the tungsten powder can be shaped by pressure in a die and fully sintered to the required porosity without the intermediate steps of machining the body.

Next, a suitable mixture of BaO and one or more of the aforesaid oxides is prepared. In the example about to be described, which is only illustrative of the invention, the other oxide is aluminum oxide and the barium oxide and aluminum oxide are used in a 5:2 mol ratio. Since I may make cathodes using with BaO any of the other oxides mentioned or mixtures thereof using the exact procedures described herein, I do not wish to be limited to this example, my invention being defined by the appended claims.

A mixture of about 5 moles of $BaCO_3$ and 2 moles of $Al_2O_3$ is prepared and pre-fired in air to its melting point on a graphite block with a gas-oxygen flame until the $CO_2$ ceases bubbling off. The oxides combine to form a mixture of normal and basic barium aluminates.

Alternatively, instead of pre-firing the mixture of barium carbonate and aluminum oxide or other oxides, it may be placed in contact with the porous tungsten body which is placed in a vacuum furnace the temperature of which is slowly raised to about 1100° C. brightness to decompose the barium carbonate.

In general, whenever oxides are used which form compounds with BaO, as for example $Al_2O_3$, I prefer to fire the mixture in air to form the compounds. However, when using the alternative method in which firing is carried out in vacuum and in contact with a preformed porous body of refractory metal, the temperature must be very slowly raised to allow oxide-forming compounds to break down to the corresponding oxides since during this process considerable quantities of gas are evolved.

If a pre-fired mixture is used, which I have found preferable, it is first pulverized and placed in contact with a surface of the tungsten body. Next, the porous tungsten body with the aluminate mixture is placed in a vacuum furnace having a low thermal capacity and the temperature slowly raised to about 1100° C. and maintained there for about 5 minutes to de-gas the tungsten body and break down residual carbonates and hydroxides in the impregnant mass.

The temperature of the tungsten body and of the aluminate mixture is then rapidly raised to a temperature slightly above the melting point of the impregnant, i. e. 1700° C. brightness, for the shortest possible time required to partially or entirely fill the pores. This time will vary principally with the required depth of penetration of the body. For a body having a thickness of about 0.040 inch and a density of 83% of theoretical density the entire thickness is filled in about 15 seconds, from the moment the impregnant starts melting.

If the mass to be impregnated is very large the rate of heating is reduced to permit the temperature of the body and of the impregnant to increase at approximately the same rate and to allow the body to reach the melting point temperature of the impregnant when the impregnant melts and infiltrates the body.

As soon as impregnation is completed, heating is stopped and the impregnated body rapidly cooled to a dull red heat (500–600° C.) in about 45 seconds. This rapid cooling is essential in order to minimize the reaction which takes place between the tungsten and the material in the pores at elevated temperatures.

The important consideration is the initial portion of the cooling cycle wherein the rate of cooling is most rapid. Hence, for best results it is desirable that the temperature be dropped at least 500° C. in not more than about 60 seconds and preferably in substantially less time than that, if possible. In the illustrated example it will be observed that this condition is fulfilled in about 10–20 seconds.

Where the construction of the furnace or the mass of the impregnated body does not allow sufficiently rapid cooling by radiation loss alone, I prefer to introduce immediately upon shutting off the heating current a small amount of a dry inert or slightly reducing gas which will increase the cooling rate since such cooling will now take place not only by radiation loss but also by convection currents and conduction.

After the body has cooled sufficiently, the excess impregnant material is mechanically removed and the impregnated body assembled into a suitable structure for mounting in an evacuated envelope.

I have made in addition to the foregoing cathode, cathodes which comprise a dense tungsten body having pores therein impregnated with a mixture barium oxide and boric oxide containing over 70% by weight of barium oxide and with mixtures of barium oxide, aluminum oxide and boric oxide with over 60% by weight of barium oxide with the proportions of the latter constituents varying over wide ranges.

While I have thus described my invention in connection with specific materials and procedures, obvious changes in both materials and techniques are within the spirit of my invention as defined in the appended claims.

What I claim is:

1. A method of manufacturing a thermionic cathode adapted to operate at elevated temperatures which comprises forming a porous body of sintered refractory metal, impregnating in an inert atmosphere the pores of said body with a molten mixture of barium oxide and an oxide selected from the group consisting of aluminum oxide, silicon dioxide, boric oxide, beryllium oxide, neodymium oxide, lanthanum oxide and praseodymium oxide, a major proportion of the oxides being barium oxide, and cooling said impregnated body to dull red heat in less than about one minute.

2. A method of manufacturing a thermionic cathode adapted to operate at elevated temperatures which comprises forming a porous body of sintered tungsten, impregnating in an atmosphere of hydrogen and nitrogen the pores of said body with a molten mixture of barium oxide and aluminum oxide, the mole ratio of barium oxide to aluminum oxide being about 5:2, and cooling said impregnated body to dull red heat in less than about one minute.

References Cited in the file of this patent

UNITED STATES PATENTS

| | | |
|---|---|---|
| 1,794,298 | Just | Feb. 24, 1931 |
| 2,677,623 | Delrieu | May 4, 1954 |
| 2,686,735 | Thomas | Aug. 17, 1954 |
| 2,700,000 | Levi | Jan. 18, 1955 |

UNITED STATES PATENT OFFICE

CERTIFICATE OF CORRECTION

Patent No. 2,813,807                                    November 19, 1957

Roberto Levi

It is hereby certified that error appears in the above numbered patent requiring correction and that the said Letters Patent should read as corrected below.

In the drawing, the penultimate step of the flow diagram (next to last rectangle on the right-hand side) for the word "moisture" read --mixture--.

Signed and sealed this 4th day of February 1958.

(SEAL)
Attest:
KARL H. AXLINE

Attesting Officer

ROBERT C. WATSON
Commissioner of Patents